July 9, 1957     E. H. ZAHN     2,798,294
DENTAL APPLIANCE
Filed Dec. 27, 1954
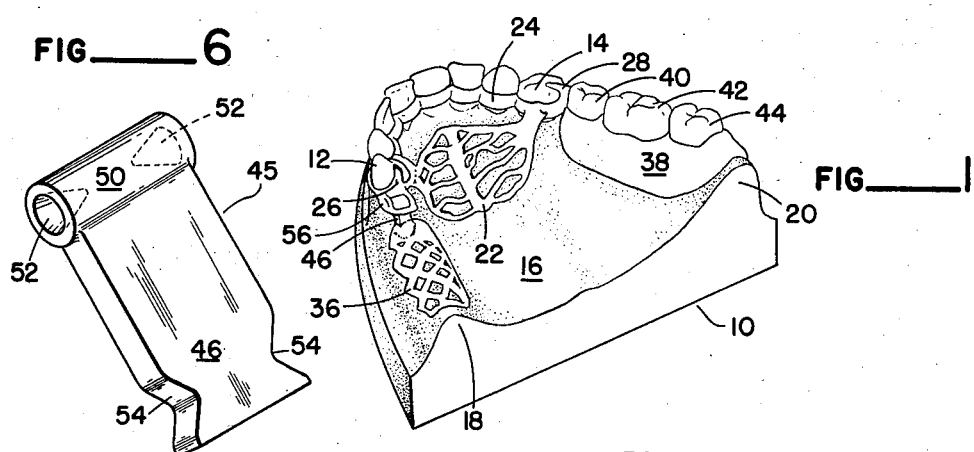
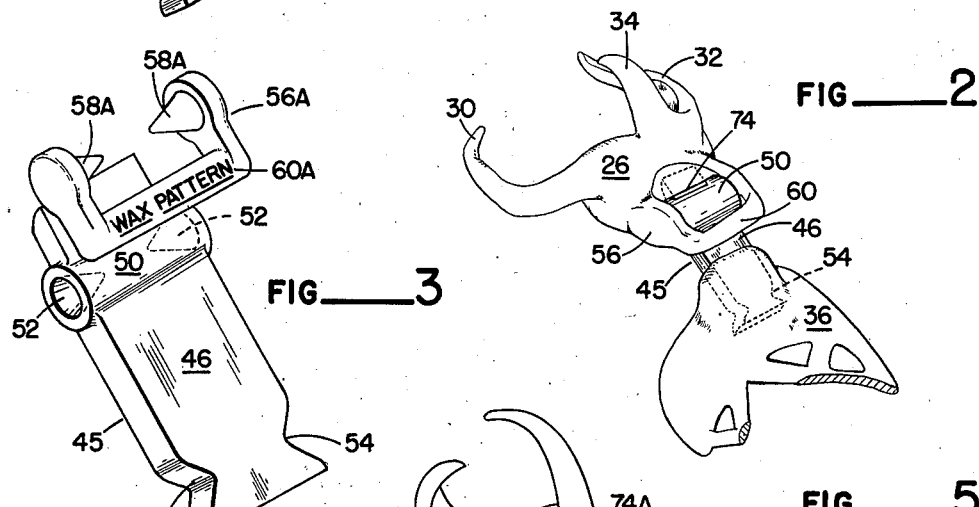
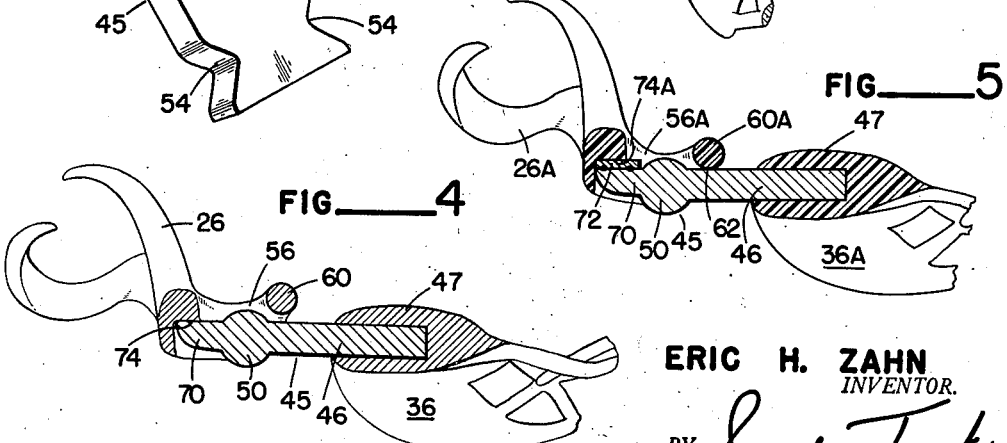
ERIC H. ZAHN
INVENTOR.
BY Smith & Tuck United States Patent Office 2,798,294
Patented July 9, 1957

2,798,294
DENTAL APPLIANCE

Eric Henry Zahn, Bellevue, Wash., assignor to Austenal, Inc., Chicago, Ill., a corporation of New York Application December 27, 1954, Serial No. 477,768

5 Claims. (Cl. 32—5)

The preparation and installation of partial dentures or dental appliances is a complex and detailed undertaking involving many skills and arts on the part of the technician and dentist. By well known means and processes, the dentist forms a maxilla or mandible model accurately reflecting the conditions in a patient's jaw. In such model will be duplicates of the natural teeth in place as well as the edentulous areas along the ridge which are to be filled by the dental restoration. Upon such a model, the technician lays out and sketches the outline and design of a metallic frame to which will be attached the restoring teeth. His design includes the necessary clasps and saddles and palatal tie bars that will effectively position the dental appliance within the mouth and retain it there under various conditions including mastication.

The model is "waxed" by the application of bars and sheets and strips and rods of wax to the technician's outlined design. This wax pattern is applied to the model by heating, shaping, trimming and smoothing the wax until the design is achieved. Subsequently the waxed pattern and the model supporting it is invested or flasked, usually within a metal ring. Following the investment, the wax is burned out of the invested mold in a suitable manner. This provides a cavity which is an exact duplicate of the desired shape of a metallic frame to be used in a dental appliance.

The cavity within the investment and around the model is then filled with molten metal from a crucible which is carried to the inner molds by suitable passages. Following this formation and a cooling of the casting, the investment is cracked and the model and the metallic frame may be removed for the technician's further work involving cutting, polishing, shaping, and, in general, finishing the denture.

A distal extension saddle of a denture, applied in a cantilevered manner to a ridge in the mouth, rests upon tissue that has underlying bone structure. During functioning of the appliance, as when food is masticated, pressure is applied on the tissue overlying the bone and the denture resting thereon moves closer to and then away from the bone due to the resiliency of the tissue. This movement can be in a 2 to 4 millimeter range. In the case of removable dental appliances held to the natural teeth by clasps, a tilting or twisting action is applied upon the abutment teeth due to the immobility of the clasps and give of the distal extension. Over a period of time the twisting of the abutment teeth results in their being loosened to such an extent that their extraction becomes inevitable and the patient is then required to have a new appliance made incorporating further restored teeth. It is conceivable that eventually the person would lose all his teeth to which a removable or partial denture could be attached.

In an effort to overcome objections to rigid partial denture constructions, and to minimize deleterious results of lever-action and micro-mobility of the appliance, or a part thereof, upon natural abutment teeth, stress-breakers or stress-relieving structures have been proposed.

Prior schemes have been designed for relative vertical movement between the connected parts of the dental appliance; movement in other directions being provided by lost motion in the connection. Appliances embodying schemes such as this are difficult and costly to produce and have not been generally accepted.

Other schemes involving, for example, split bars, soldering, welding and the like, have also been proposed. Appliances embodying these latter schemes have also been difficult and costly to produce and have not been as satisfactory as desired. Moreover, due to the small confines within which to work in appliances of this sort, the problem of forming pivotal connections in appliances of this sort, has been a difficult one. Soldering, welding, and the like, have usually been resorted to in forming such connections, notwithstanding the difficulties and cost involved.

One of the objects of the present invention is to provide an improved stress-relieving attachment for partial dentures and the like which will overcome the shortcomings and difficulties encountered with prior stress-relieving schemes.

Another object is to provide an improved stress-relieving attachment which is less expensive and may be formed quickly and expeditiously; also a stress-relieving attachment that is adaptable to the "lost-wax" technique of metal casting; may be produced by less skilled and less experienced operators or technicians, and may be readily adjusted to the patient's mouth.

Another object is to provide an improved method of forming a hinge connection, for example, between the clasp and restoration sections of a dental appliance by casting an improved form of first hinge part on one of the members and in direct hinge coaction with a second complementary hinge part on the other member and with the hinge connection allowing relative pivotal movement between the members.

Another object is to prevent fusion of one hinge part to the other hinge part and free pivotal movement of one hinge part relative to the other hinge part by forming an oxidized surface on one hinge part prior to casting the other hinge part in complementary hinge coaction therewith.

Another object is to provide for utilizing slight shrinkage upon cooling of the hinge part which is cast in hinge coaction with the other hinge part, to assure free pivotal movement of one hinge part relative to the other hinge part.

Another object is to provide a hinge member which may be distributed as such, for example, to dental laboratories and the like, and which comprises, a metallic hinge member for attachment to one of the sections of the dental appliance, a first hinge part on such hinge member, a pattern part carried by the first hinge member and eliminatable by heat from a mold, and oppositely directed axially aligned and generally transversely disposed trunnions on one of said hinge pattern parts and engaging in recess means in the other of these parts; the pattern when invested and eliminated forming a cavity in which a second hinge part may be cast in direct hinge coaction with the first hinge part and with the hinge connection allowing relative pivotal movement between the sections of the appliance.

Another object is to provide a hinge member of the character set forth wherein one of the first hinge and pattern parts is provided with stop means forming an abutment for limiting movement of the connected section of the dental appliance relative to the other section.

Another object is to provide a hinge member of the character set forth wherein the trunnions and recess means in which the trunnions engage are of generally conical form.

Another object is to provide a hinge member of the character set forth wherein the trunnions are of generally conical form and project in opposite directions from arms on the first hinge part, and the recess means in which the trunnions engage is of generally conical form and disposed in axially aligned and oppositely facing relation in the opposite ends of a lug formed on the first hinge part and fitting between the arms on the second hinge part.

Another object is to provide an improved method of forming a hinge connection of the class described.

These and other objectives and advantages of the invention will be apparent during the course of the following specification, when read in connection with the accompanying drawings, in which:

Figure 1 is a perspective view of a dental model having mounted thereon a partially constructed rugae bar case, and typifying an application of my invention in the production of dental appliances;

Figure 2 is an enlarged view in perspective of a hinge construction for distal extensions in dental appliances according to my invention;

Figure 3 is an enlarged exploded view in perspective of the parts of a metallic hinge element and the prepared wax pattern of the mating part;

Figure 4 is an enlarged side view of the clasp, hinge, and saddle assembly in nearly completed form with certain parts sectioned;

Figure 5 is a view similar to Figure 4 showing the parts in an intermediate step of processing; and Figure 6 is a perspective view of a modified metal hinge member.

Referring now to Figure 1 of the drawings, it will be seen that there is shown a maxilla model 10 of a person's mouth in which the natural teeth comprise the six anteriors and the first bicuspids 12 and 14 on opposite sides. In the model is represented the palatal area 16 and the edentulous ridge areas 18 and 20, to which is to be fitted the dental restoration including posterior teeth to take the place of the natural teeth which have been removed. The location of the restoration could be different, i. e., occur only on one side, or be secured to a different anterior tooth. In fact the partial denture could be fastened to a rear molar, in which case the clasp would be fastened to the rear molar and the denture lie forward thereof.

In Figure 1 is represented the cast metal denture parts including the rugae bar 22, and the tooth clasps 26 and 28. For purposes of illustration of the construction of the tooth clasp 26, reference is made to Figure 2 in which it will be seen that clasp 26 comprises two ring clasp arms 30 and 32 and the occlusal rest 34, all of which are carefully fitted to the abutment tooth 12 so that in the patient's mouth this clasp is stationary. Clasp 28 is similar in construction but not necessarily identical in detail due to variations in tooth form and the exigencies of the undertaking.

Extending between clasp 26 and clasp 28 is the continuous clasp 24 which is a metallic element of scalloped shape that fits closely to the lingual surfaces of the anteriors and is rigid with the clasp. To impart further rigidity, in this typical case, the rugae bar 22 is shaped to fit the irregular ridges in the hard palate of the lower jaw. The clasp structure could be formed in somewhat different ways within the general pattern of the rugae bar type structure or another form such as the lingual bar shape with integrated saddles; but in each case the hinged structure, to be described hereafter, is the same.

Attached to the framework is the saddle skeleton 36 which comprises the openwork base for a dental restoration such as is shown on the right side of Figure 1 and includes the plastic saddle 38 and restored posterior teeth 40, 42, and 44. The plastic saddle is supported by a saddle skeleton 36, which in the manner well known to dental technicians and dentists is embedded within the plastic material forming the saddle. The saddle frames are generally aligned with the longitudinal axis of the ridge.

It will be apparent that the framework that has been described is preferably formed of metal. It may be gold or palladium, but for the purposes of my work, I prefer to use a chrome-cobalt-molybdenum alloy, known commercially as "Vitallium," because of its extreme strength even in minute cross sections and thin sections as well as its resistance to acids and alkalies and to extreme usage. This metallic framework has been produced in the manner previously and briefly described in this specification in accordance with the lost-wax method.

Referring now to Figures 2 and 3, wherein is shown an enlarged view of the hinge elements employed in Figure 1, the metallic hinge member 45 comprises the shank 46 having a pivot head 50, provided at either end with an axially aligned pair of pivot sockets or cups 52. In this case the sockets or cups are conical in shape. The opposite end of shank 46 has notches 54, 54, that aid mechanical joinder with metal which is later cast to the shank, in forming saddle 36, thus producing a firm anchor.

In the article of commerce, delivered to the dentist or technician, a wax-trunnion pattern 56A is provided having a trunnion 58A fitted to each of the recesses 52. The wax pattern is delivered with the wax trunnion 58A engaged in socket cups 52 and with a yoke stop bar 60A abutting the surface of shank 46 as at 62 in Figure 5. Therefore, as delivered to the technician, the assembly differs from the exploded view of Figure 3 only in that trunnions 58A are in place in sockets 52. The combined metal and wax device 45, 56A is the basic element of my hinge construction and is employed by technicians in forming the hinge according to the lost wax method, furnishing to such technicians a preformed model of a very intricate hinge part.

During the waxing-in process upon a model, and usually after the clasps, continuous clasps and lingual or rugae bars have been formed, it is appropriate for the hinge member of Figure 3 to be waxed in as shown in Figure 5. This is done by means of wax rods and bars that are used to fill and span the space between the wax hinge pattern 56A, the wax boss pattern 26A for the clasp 26, and the wax pattern 36A for the saddle 36. Care must be exercised to insure that the underside of shank 46 is mounted in slightly spaced apart relation to the adjacent under surface of the model in order that investment materials may flow thereunder. After positioning shank 46, the technician proceeds to wax in the remainder of the wax skeleton and in so doing applies wax around the end of the shank 46 having the notches 54 in exact duplication of the pattern for that portion of the saddle as his design requires.

Referring to Figures 4 and 5, Figure 4 represents the device as it appears with all parts formed in metal, including hinge element 56 and its yoke stop bar 60; and Figure 5 represents an earlier step in fabrication when part of the members are in the form of wax patterns. Note in Figure 5 that wax stop bar 60A abuts the adjacent surface of metal shank 46 at 62.

The burning-out operation with the chrome-cobalt-molybdenum alloy "Vitallium" is conducted at a temperature of 2000 degrees to 2150 degrees Fahrenheit during which operation the wax within the investment is driven off and the cavity formed. Plastics of certain types can be substituted for the wax, i. e., in pattern 56, providing they can be evaporated in the lost-wax process without leaving residual ash, i. e., cellulose triacetate. At this time the exposed portions of the chrome, cobalt and molybdenum hinge member 45 become oxidized on their surfaces to the advantage of the subsequent operation of forming the hinge. When the metal that becomes the trunnions contacts the metal which forms the trunnion recesses 52, the oxidized surface prevents the fusion of the formed metal and the cast metal and the parts 45, 56 of the pivot head are free for pivotal movement.

Another phenomenon of the operation which I have discovered is that the better hinge joints are formed of a pivotal member that is subsequently cast to the preformed hinge element, that is a male member rather than a female member. I have noticed that in the casting operation female members have a tendency to contract upon cooling and produce an extremely tight joint so that if there are slight imperfections in the pivotal surfaces a proper hinge is not easily obtained. For this reason I have designed the hinge, as shown in Figure 2, wherein the oxidized surface of the pivot that receives the molten metal is a female element comprising socket cup 52. When the molten metal is cast into the cavity 52 and cools, a slight shrinkage results and permits the production of a free hinge.

On the other hand, the notched end of shank 46 being a male member, which is also oxidized, receives the fluid metal so that when the latter cools it shrinks into a tight mechanical joinder; and, despite the fact that fusion does not take place, a practically immovable anchor of shank 46 in boss 47 of saddle 36 is obtained.

The yoke stop 60 serves to limit movement of the saddle portion of the dental appliance away from the ridge to which it is fitted. A freely hinged saddle, it is apparent, could drop away from the upper jaw and would do so each time the user opened his mouth. Stop 60 under such conditions is contacted by shank 46 of hinge member 45 adjacent thereto and limits this undesirable motion.

It will be apparent from the foregoing described parts that the positioning of stop bar 60 relative the location it should assume with regard saddle 36 is left to the technician unless other provision is made. It is undesirable, particularly with an upper denture, to have saddle 38 go farther away from ridge 20 than it will assume when the denture is not subject to pressure so stop bar 60 should be accurately positioned. Furthermore, it is often desirable to limit hinged movement of the denture against the underlying jaw ridge to limit pressure thereon and to avoid discernible movement of the denture in masticating.

To limit pressure on the jaw ridge and to facilitate positioning of stop bar 60, metal hinge member 45 is provided with a horn stop 70 extending on the opposite side of pivot 50 from shank 46. In the showing of Figure 5, horn 70 carries on its upper surface a nickel shim spacer 72 preferably coextensive with its upper surface and spot-welded thereto. Stop bar 60A is positioned as shown in Figure 5 and when the wax clasp pattern 26A is formed, a surface 74A abuts the upper surface of shim 72. The appliance is processed to the point that clasp 26 and saddle 36 as well as the hinge member 56 are integral therewith. At this state, the appliance is placed in heated concentrated nitric acid to react the nickel with the nitric acid removing the shim 72. This may be accomplished without reaction between the "Vitallium" and the nitric acid. With removal of shim spacer 72, abutment 74, formed from wax abutment 74A, is spaced from the upper surface of horn 70 a distance giving the desired play between stop 60 and the adjacent surface of shank 46 and between horn stop 70 and abutment 74. It will be understood that the thickness of shim 72 governs the amount of vertical movement saddle 36 is permitted and this tolerance may be changed according to the thickness of the shim. Ordinarily the appliance is supplied according to specification of the thickness of shim 72 which is usually between 10 and 15 thousandths of an inch. By these means the technician merely has to wax the parts in place and need have no regard for the spacing of shank 46 and stop bar 60 and of horn 70 and abutment 74, the tolerance being automatically provided in later processing of the appliance.

In Figure 6, metal hinge member 45 is formed identically to the Figure 3 showing with the exception that horn stop 70 is eliminated. A wax pattern 56A fits in sockets 52 in the manner herebefore described. The processing of the hinge is the same except abutment 74 is not formed.

While I have shown and described a particular embodiment of my invention, I do not wish to be limited to the exact details disclosed but rather wish to cover those modifications thereof properly within the scope of my invention, as defined in the following claims.

I claim:

1. A dental restoration having a clasp section to engage an abutment tooth, a restoration section to cover a ridge of the mouth, and a stress-breaker therebetween, comprising: a metallic first hinge member having a shank anchored to said restoration section and a pivot head at the free end of said shank having an oppositely open pair of axially aligned bearing cups; a metallic trunnion hinge member forming a part of said clasp section having a pair of axially aligned trunnions positioned in said bearing cups and having means independent of said clasp section connecting the trunnions and including a stop bar extending laterally of said shank at a point spaced from said pivot head to form an abutment for said restoration section limiting movement away from said ridge, said first metallic hinge member having an integral stop lug protruding angularly relative the bearing cup axis, and a coacting overhanging stop formed on said clasp section to limit movement of said restoration against said ridge.

2. The subject matter of claim 1 in which there is a shim secured on the surface of said abutment stop lug which will abut said overhanging stop, said shim being formed of a metal different than said first metallic hinge member and which may be removed by reaction with an acid without deterioration of said first metallic hinge member.

3. Means for forming a stress-breaker in a dental restoration that includes a clasp section to engage an abutment tooth and a restoration section to straddle a ridge of the mouth adjacent such abutment tooth, comprising: a metallic first hinge member having a shank to be anchored to said restoration section, and a pivot head at one end of said shank having an oppositely open pair of axially aligned bearing cups; a trunnion hinge member pattern, to be reproduced as a cast-in-place hinge member carried by said clasp section, formed of material normally volatilizable in the lost-wax process, and including a yoke supporting a pair of axially aligned trunnion patterns positioned in said bearing cups, said yoke including a stop bar positioned relative said shank to limit movement of the restoration section away from said ridge, the pivot head including an integral stop lug protruding angularly therefrom relative the bearing cup axis to coact with a shoulder to be formed on the clasp section to limit movement of said restoration toward said ridge.

4. The subject matter of claim 3 in which there is a shim secured on the abutting surface of said stop lug which will abut an overhanging stop, said shim being formed of a different metal than said metallic hinge member and which is more acid reactive than said metallic hinge member.

5. Means for forming a stress-breaker in a dental restoration that includes a clasp section to engage an abutment tooth and a restoration section to straddle a ridge of the mouth adjacent such abutment tooth, comprising: a metallic first hinge member having a shank to be anchored to said restoration section and a pivot head at one end of said shank, a pattern element of a second hinge member pattern, to be reproduced as a cast-in-place hinge member carried by said clasp section, formed of material normally volatilizable in the lost-wax process, and including means forming a socket to receive said pivot head for hinging operation, said pattern element including a member to abut said shank in spaced relation to said pivot head to limit movement of the restoration section away from its ridge, the pivot head including an integral stop lug protruding angularly therefrom relative the hinge axis to coact with a shoulder to be formed on the clasp section to limit movement of said restoration toward said ridge.

References Cited in the file of this patent

UNITED STATES PATENTS

| | | |
|---|---|---|
| 1,438,167 | Brown | Dec. 12, 1922 |
| 1,480,549 | Emerson | Jan. 15, 1924 |
| 2,227,735 | Morton | Jan. 7, 1941 |
| 2,550,436 | Yates | Apr. 24, 1951 |